(12) United States Patent
Turco et al.

(10) Patent No.: US 8,342,280 B2
(45) Date of Patent: Jan. 1, 2013

(54) AGRICULTURAL VEHICLE SUSPENSION

(75) Inventors: Patrizio Turco, Bruino (IT); Michele Ieluzzi, Turin (IT)

(73) Assignee: CNH America LLC

( * ) Notice: Subject to any disclaimer, the term of this patent is extended or adjusted under 35 U.S.C. 154(b) by 0 days.

(21) Appl. No.: 13/569,928

(22) Filed: Aug. 8, 2012

(65) Prior Publication Data

US 2012/0299332 A1  Nov. 29, 2012

Related U.S. Application Data

(62) Division of application No. 12/712,783, filed on Feb. 25, 2010, now Pat. No. 8,261,869.

(30) Foreign Application Priority Data

Feb. 26, 2009  (IT) .............................. TO2009A0139

(51) Int. Cl.
*B60G 17/00* (2006.01)
(52) U.S. Cl. ............... 180/89.12; 280/5.507; 280/6.154; 280/124.161; 296/190.01; 296/190.07; 267/64.17
(58) Field of Classification Search ............... 180/89.12, 180/89.15; 280/5.508, 5.512, 5.514, 5.515, 280/6.157, 6.159, 5.507, 124.161; 267/64.16, 267/64.17, 64.19; 296/190.01, 190.07
See application file for complete search history.

(56) References Cited

U.S. PATENT DOCUMENTS

| | | | |
|---|---|---|---|
| 4,478,431 A | 10/1984 | Muller et al. | 280/6.159 |
| 5,584,498 A | 12/1996 | Danek | 280/5.503 |
| 5,954,149 A | 9/1999 | Williams | |
| 6,010,139 A | 1/2000 | Heyring et al. | 280/124.104 |
| 6,220,613 B1 | 4/2001 | Franzini | 280/124.106 |
| 6,250,658 B1 * | 6/2001 | Sakai | 280/124.106 |
| 6,273,203 B1 | 8/2001 | Paggi | |
| 6,338,014 B2 | 1/2002 | Heyring et al. | 701/37 |
| 6,405,750 B1 | 6/2002 | Rogala | 137/493.8 |
| 6,575,484 B2 | 6/2003 | Rogala et al. | 280/124.158 |
| 6,834,736 B2 | 12/2004 | Kramer et al. | 180/89.12 |
| 7,048,280 B2 | 5/2006 | Brandenburger | 280/5.519 |
| 7,073,803 B2 | 7/2006 | Huth | 280/124.159 |
| 7,198,125 B2 | 4/2007 | Skelcher | |
| 7,234,386 B2 | 6/2007 | Schedgick et al. | 92/113 |
| 7,350,793 B2 | 4/2008 | Munday | 280/124.106 |
| 7,497,452 B2 | 3/2009 | Schedgick | 280/124.158 |
| 7,686,309 B2 | 3/2010 | Munday et al. | 280/5.507 |
| 2004/0061292 A1 * | 4/2004 | Hall | 280/5.507 |
| 2005/0082127 A1 | 4/2005 | Barber | |
| 2007/0044654 A1 | 3/2007 | Schedgick | |

* cited by examiner

*Primary Examiner* — Faye M Fleming
*Assistant Examiner* — James English
(74) *Attorney, Agent, or Firm* — Sue C. Watson

(57) ABSTRACT

An agricultural vehicle having a hydraulic system, a cab for the vehicle operator includes a self-levelling cab suspension system having a plurality of suspension units each having a spring, a damper and an accumulator. The accumulator comprises a hydraulic working chamber which is separated by a movable wall from a gas filled chamber serving as a spring. The working chamber is also connected to a working chamber of the damper in a closed hydraulic circuit. In the invention, there is no need for a dedicated oil pump since a hydraulic actuator powered by the vehicle hydraulic system is provided for causing hydraulic fluid to flow in the closed hydraulic circuit between the working chamber of the accumulator and the damper, to vary the height of the cab without fluid from the vehicle hydraulic system entering or leaving the closed hydraulic circuit of the damper and accumulator.

3 Claims, 3 Drawing Sheets

AGRICULTURAL VEHICLE SUSPENSION

CROSS REFERENCE TO RELATED APPLICATIONS

This present application is a divisional application of U.S. patent application Ser. No. 12/712,783 filed Feb. 25, 2010 now U.S. Pat. No. 8,261,869, by Patrizio Turco and Michele Ieluzzi, entitled "AGRICULTURAL VEHICLE SUSPENSION", which is hereby incorporated by reference herein in its entirety for all purposes, which claims priority under 35 U.S.C. 119(a)-(e) or 365(b)-(c) to foreign application number TO2009A000139, filed Feb. 26, 2009, by Patrizio Turco and Michele Ieluzzi, entitled "AGRICULTURAL VEHICLE SUSPENSION", which is also hereby incorporated by reference herein in its entirety for all purposes.

TECHNOLOGY FIELD

The present invention relates to an agricultural vehicle having a hydraulic system, a cab for the vehicle operator and a cab suspension system comprising a plurality of suspension units each having a spring, a damper and an accumulator, wherein the accumulator comprises a hydraulic working chamber which is separated by a movable wall from a gas filled chamber serving as a spring, and is connected to at least one working chamber of the damper in a closed hydraulic circuit.

BACKGROUND

It is common to design agricultural vehicles, such as tractors, with so-called structural engines. In such vehicles, the engine, together with the transmission and the rear axle, constitute the rigid chassis of the vehicle. Because there is no suspension between the chassis and the ground, at least at the rear of the vehicle, shocks resulting from unevenness in the terrain are transmitted directly to the driver's cab.

To improve the comfort of the driver, it is known to pivot the cab about a transverse axis at its front end and to provide at least one suspension unit, comprising a spring and a damper, between the rear end of the cab and the chassis. This allows a cushioned up and down movement of the cab on the chassis. Such an arrangement is shown in FIGS. 1 and 2 of the accompanying drawings, in which FIG. 1 is a schematic representation of a cab that is pivotable at its front end and supported at its rear end on suspension units, and FIG. 2 is a detailed perspective view of the suspension unit in FIG. 1.

In FIG. 1, the front end of the cab 10 is pivoted about an axis 12 that is fixed to the chassis. A suspension unit 14 at the rear of the cab, as better shown in FIG. 2, has a flexible strap 16 attached to a bracket 18 fixed to the vehicle chassis at one end and at its other end to a bracket 20 attached to the cab 10. The flexible strap 16 acts as an anchor which allows the cab 10 to move up and down relative to the chassis while preventing it from moving upwards beyond acceptable limits.

The suspension unit 14 is shown as having a strut 22 that incorporates a spring 24 and a damper 26. The spring 24 which supports the weight of the cab, need not be a coil spring, nor need it be concentric with the damper. It may alternatively be a gas spring or a leaf spring mounted separately from the damper. FIG. 2 also shows that a resilient bump stop 28 is provided to cushion the cab if the suspension ever reaches the end of its permissible travel.

While such a cab suspension goes some way towards improving the ride quality in the cab, it still suffers from the disadvantage that when the tractor is being driven along an incline, the cab and the driver's seat, though parallel to the ground, are inclined relative to the horizontal and this causes discomfort to the driver, aside from being disconcerting. Similarly, when the tractor is being driven up or down an incline the cab can assume an extra-pitch angle causing discomfort to the driver.

It is therefore desirable to provide the cab of an agricultural vehicle with a self-levelling suspension system which maintains an optimal attitude of the cab controlling roll and pitch angles, even if the inclination of the ground over which the vehicle is travelling varies within certain limits.

In U.S. Pat. No. 6,273,203, there is disclosed a suspension system that employs four hydraulic actuators capable of tilting the cab about mutually inclined axes and a control system for independently controlling each of the hydraulic actuators in dependence upon signals received from sensors, which can be constructed as inclinometers or gyroscopes. In this known system, the fact that all four actuators can be independently controlled makes for a complicated control system. This is because the control algorithm needs to take into account when an actuator is near the bottom or top of its stroke and is therefore unable to bring about the required tilt of the cab.

The Applicants' earlier U.S. Pat. No. 7,198,125 mitigates some of the above disadvantages and provides a vehicle having a chassis and a cab connected to the chassis by means of a support system which comprises two pairs of hydraulic actuators, each pair of actuators being operative to tilt the cab relative to the chassis about a respective one of two mutually inclined axes. The two actuators of each pair are connected to a common pumping element in such a manner that whenever the volume of hydraulic fluid in one of the actuators in a pair is reduced, the volume of hydraulic fluid in the other actuator of the same pair is correspondingly increased.

A disadvantage of U.S. Pat. No. 6,273,203, U.S. Pat. No. 7,198,125 and other prior art cab suspension systems which use hydraulic dampers as actuators to level the cab stems from the fact that they require a dedicated pumping unit. Such pumping units need furthermore to be fairly substantial as they are required to supply hydraulic fluid to the actuators sufficiently rapidly to counteract changes in the inclination of the chassis.

SUMMARY

The present invention seeks to provide a suspension system for the cab of an agricultural vehicle that dispenses with the need for a dedicated pumping unit.

An agricultural vehicle has a vehicle hydraulic system, a cab for the vehicle operator and a self-levelling cab suspension system comprising a plurality of suspension units each having a spring, a damper and an accumulator, wherein the accumulator comprises a hydraulic working chamber which is separated by a movable wall from a gas filled chamber serving as a spring, and is connected to at least one working chamber of the damper in a closed hydraulic circuit, characterised in that a hydraulic actuator powered by the vehicle hydraulic system is provided for causing hydraulic fluid to flow in the closed hydraulic circuit between the working chambers of the accumulator and the damper, so as to vary the height of the cab without any fluid from the vehicle hydraulic system entering or leaving the closed hydraulic circuit of the damper and the accumulator.

The actuator may be formed as a separate unit having two hydraulic working chambers separated by a movable wall, one of the working chambers being connected by an associated changeover valve to a supply and a return line of the vehicle hydraulic system and the other working chamber being connected to the hydraulic working chamber of the accumulator.

A single such actuator may advantageously be connected to the accumulators of a plurality of suspension units by way of respective isolation valves.

As an alternative the actuator may be integrated with the accumulator into a single unit having two movable walls defining three variable volume working chambers, consisting of two hydraulic working chambers separated from one another by a gas filled working chamber, one of the hydraulic working chambers being connected to at least one of the working chambers of the damper and the other hydraulic working chamber being connected by a changeover valve to a supply and a return line of the vehicle hydraulic system.

In both embodiments, the same changeover valve may be shared by a plurality of suspension units by providing isolation valves between the changeover valve and the suspension units.

It is desirable in the invention that the hydraulic system present in most agricultural vehicle, to serve as oil pressure supply for the gearbox, also referred to as the vehicle hydraulic system, is used to power the cab suspension, thereby obviating the need for a dedicated pump. Such an oil supply does not have the purity needed by the damper and the accumulator of a suspension unit but the invention avoids this problem by maintaining the closed hydraulic circuit of the suspension unit isolated from the less pure oil drawn from the vehicle hydraulic system.

Another preferable feature of the invention is that the hydraulic working chamber of the accumulator is isolated when the engine is at a standstill so that the level of the cab is maintained even after the engine is switched off. In case of excessive oil venting through the changeover valve toward the return line, or in case of pipes damage, the floating piston inside the actuator reaches its maximum travel and acts to limit cabin suspension stroke.

According to a further embodiment of the present invention the suspension units are paired in the manner proposed in EP 1 419 956. In this way, the volume of fluid that needs to be displaced by the actuator to change the attitude of the cab is reduced because one of the suspension units will supply at least some of the fluid required by the other.

DESCRIPTION OF THE DRAWINGS

The invention will now be described further, by way of example, with reference to the accompanying drawings, in which.

DETAILED DESCRIPTION

Figure 1:
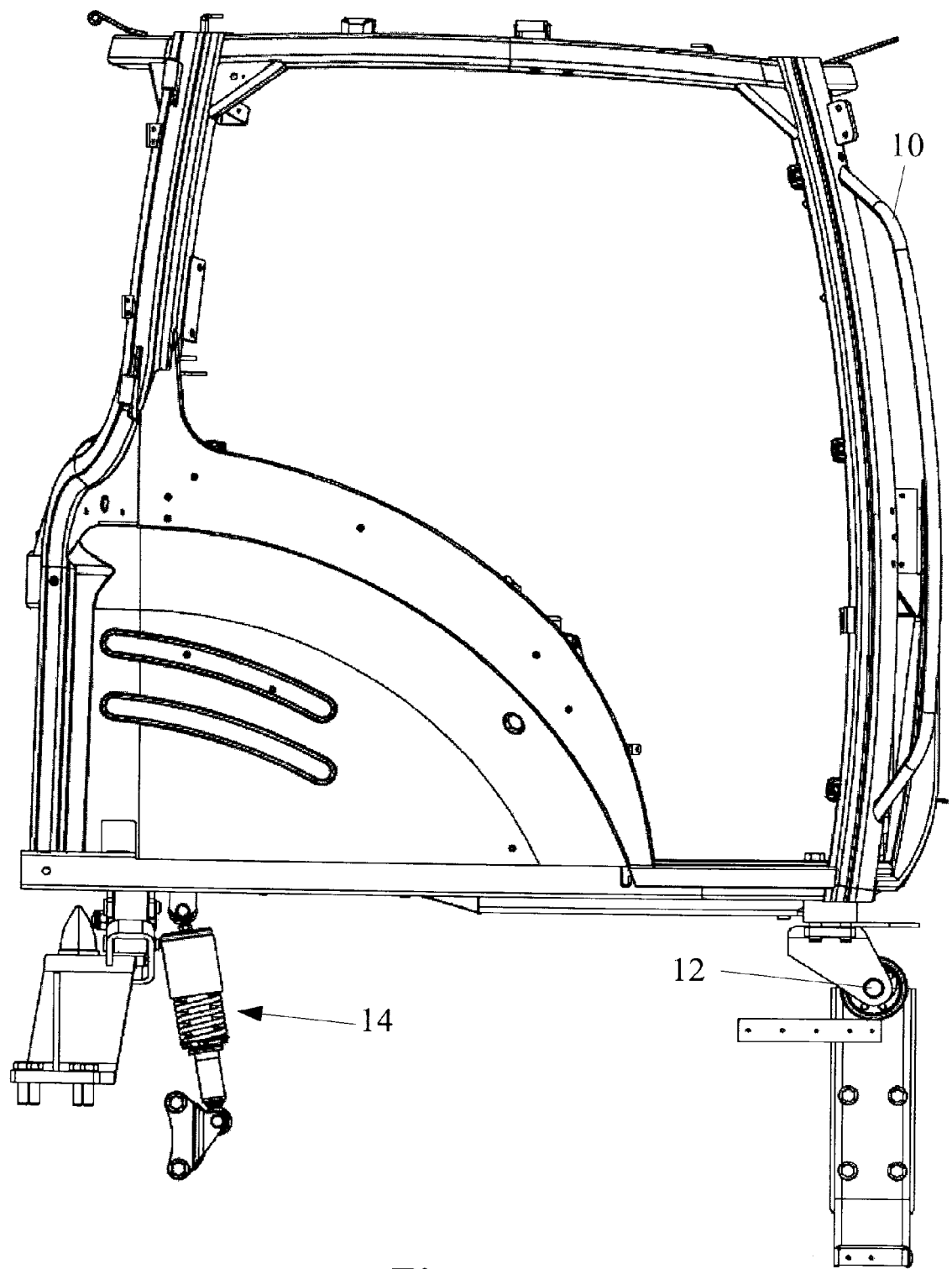
FIGS. 1 and 2 have already been described above and show a cab suspension in which the front end of the cab is pivoted to the chassis and only the rear end is supported by two suspension units.
Figure 2:
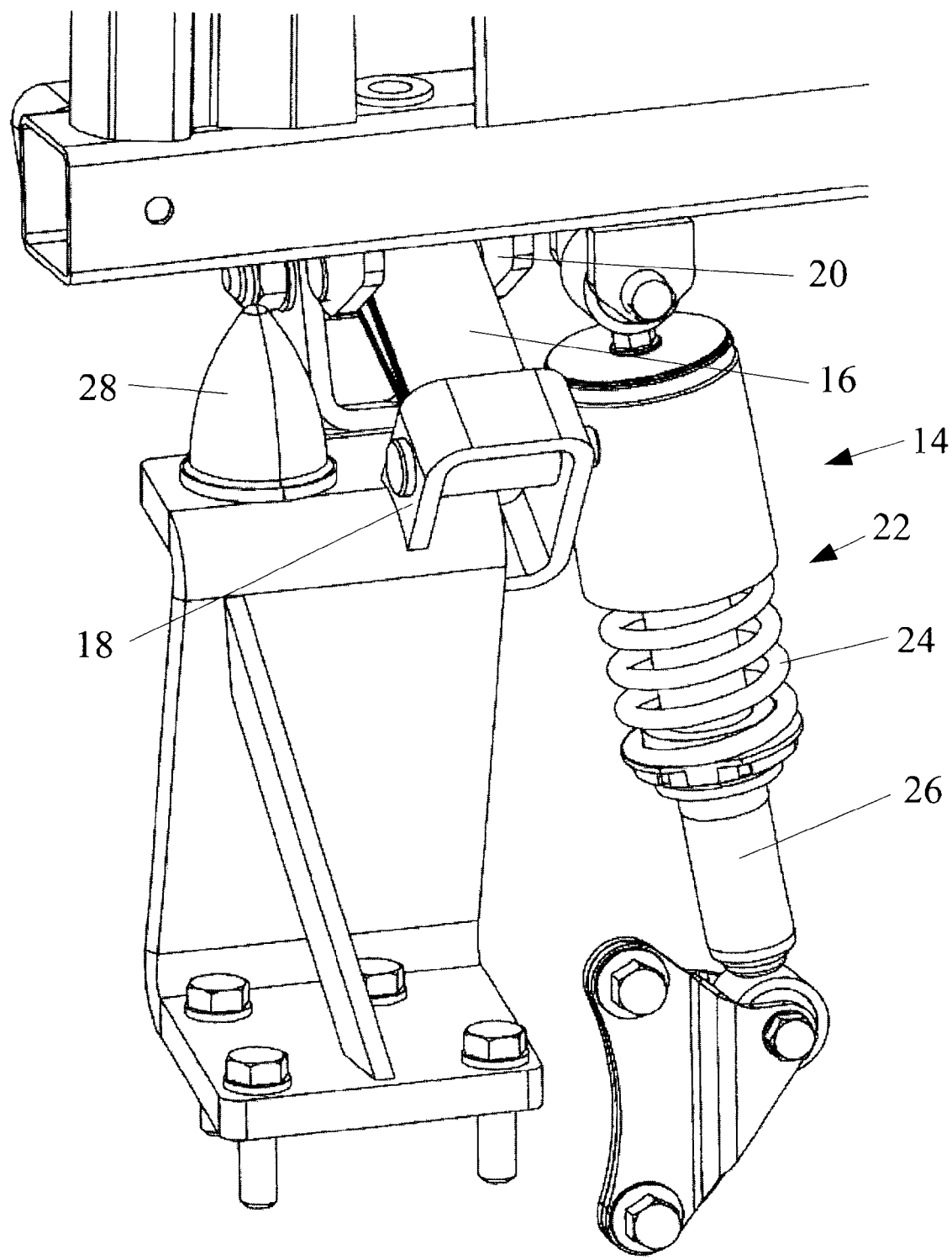

While the invention can be used in a cab suspension as shown in FIGS. 1 and 2 it is also possible to provide suspension units at the four corners of the cab to control pitch and roll. The hydraulic circuits shown in FIGS. 3 and 4 each show one pair of suspension units. It is also possible to couple the suspension units in pairs in the manner previously proposed in U.S. Pat. No. 7,198,125.

Figure 3:
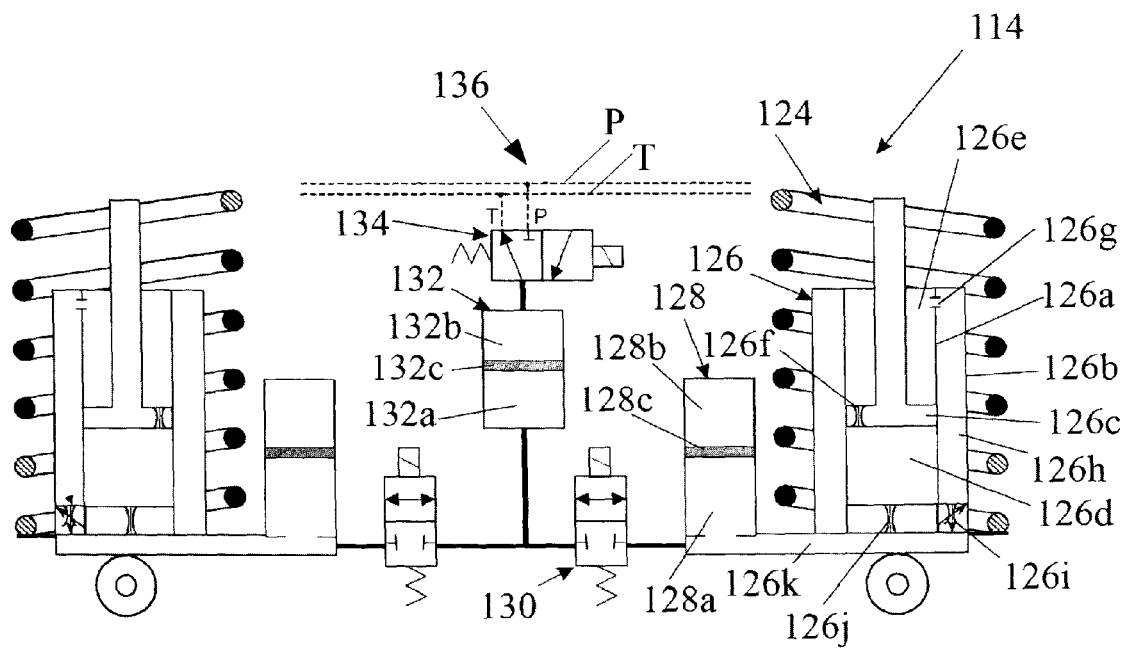
FIG. 3 is a hydraulic circuit diagram of a cab suspension in accordance with a first embodiment of the invention.

The two suspension units 114 in FIG. 3 are identical with one another and only one of them will therefore now be described. Each suspension unit comprises an adjustable damper 126, such as for example a variable stiffness damper, a coil spring 124 surrounding the damper 126, a hydro-gas accumulator 128 and an isolation valve 130. The two suspension units 114 are connected to a common actuator 132 which in turn is connected by way of a changeover valve 134 to the supply and return lines P and T of the vehicle hydraulic system 136.

The damper 126 can be, for example, a twin tube damper having an inner tube 126a and an outer tube 126b. A piston 126c divides the inner tube 126a into two variable volume working chambers 126d and 126e that communicate with one another through a throttle valve 126f in the piston 126c. The working chamber 126e above the piston 126c communicates through an orifice 126g with the space 126h between the two tubes 126a and 126b. A supply port 126k communicates with the working chamber 126d through a fixed throttle valve 126j and with the space 126h between the two tubes 126a and 126b through an electrically variable throttle valve 126i that controls the stiffness or damping ratio of the damper 126.

The supply port 126k is connected to the hydraulic working chamber 128a of the associated accumulator 128. The accumulator 128 has a gas filled working chamber 128b separated from the chamber 128a by a movable wall 128c that is shown as being a floating piston. As an alternative, the movable wall 128c can be formed by a resilient diaphragm.

Each accumulator 128 is connected by a respective shut-off or isolation valve 130 to the common actuator 132. The actuator 132 has a first hydraulic working chamber 132a connected via the shut-off valve 130 in circuit with the hydraulic working chambers of the accumulator 128 and the damper 126. The actuator 132 has a second hydraulic working chamber 132b, separated from the working chamber 132a by a movable wall 132c that is shown as being a floating piston and connected via the changeover valve 134 to the supply P and return T lines of the vehicle hydraulic system 136. The vehicle hydraulic system 136 can provide hydraulic fluid under pressure but not of a quality that is suitable for circulating in the closed hydraulic circuit of the damper 126 and the accumulator 128. As an alternative, the movable wall 132c can be formed by a resilient diaphragm.

When the vehicle is driven over smooth level ground, the weight of the cab 10 is supported by the coil springs 124 and the gas springs of the suspension units 114 and there is no movement of the pistons 126c.

If the vehicle is driven over an uneven but level terrain, the cab 10 moves vertically on the coil springs 124 and the gas springs of the accumulators 128 but the movements are damped by the damper 126. Supposing for example the piston 126c moves downwards on account of the wheel encountering a bump on the ground. The volume of the working chamber 126d will be reduced and will displace some hydraulic fluid through the throttle valve 126f into the upper working chamber 126e. As the piston 126c is a differential piston (on account of the cross sectional area of the piston rod), the reduction in volume of the working chamber 126d will be greater than the increase in volume of the working chamber 126e. The surplus hydraulic fluid will therefore flow through the space 126h between the two tubes 126a and 126b of the damper 126 and via the variable throttle 126i and the port 126k into the working chamber 128a of the accumulator.

The flow of the hydraulic fluid is thus opposed by the air spring of the accumulator 128 and will encounter resistance while flowing through the throttle valves 126f and 126i to provide the desired damping. Upwards movement of the piston 126c will likewise be assisted by the air spring of the accumulator 128 but resisted by the flow through the throttle valves 126i and 126j.

The accumulator 128 accommodates the changes in the total volume of the hydraulic fluid contained in the damper 126 as the piston rod moves up and down and the throttles control the degree of damping. By making the throttle valve 126i variable, for example electrically, the force and/or the stiffness of the damper 126 can be adjusted by a control system to suit different driving conditions.

As is known, one way valves may be incorporated into the damper to vary the degree of damping in dependence upon the direction of movement of the piston 126c.

The suspension system as described so far can be controlled in a known manner in dependence on the output signal of various sensors responsive to such parameters as speed and acceleration to optimise the operator comfort under different driving conditions. For example, the force and/or the stiffness of the dampers may be changed when driving on metalled roads. Furthermore, the stiffness or the damping ratio of the dampers may be increased as they reach the end of their travel to avoid bottoming of the suspension.

Because the piston 126c is a differential piston, each of the dampers 126 is also capable of functioning as a hydraulic jack. If hydraulic fluid is somehow introduced into the lower working chamber 126d of the damper 126, the cab will be raised and conversely if fluid is drained from the working chamber 126d, the cab will be lowered. The damper 126 can thus be used to adjust the attitude of the cab when the vehicle is driven on an inclined surface in order to maintain the cab level, both about the pitch axis and the roll axis of the cab.

Supposing now that the two suspension units 114 in FIG. 3 are mounted one at the back and the other at the front of the cab and the vehicle starts to travel down an incline. To level the cab, one of the pistons 126c has to be raised and the other lowered. In the prior art, this was achieved by pumping hydraulic fluid from one suspension unit to the other using a dedicated pumping unit. However, as earlier mentioned, the pumping unit needed to be substantial and, in order to dispense with the need for such a pumping unit, the invention uses in its place the actuator 132, which is powered by the vehicle hydraulic system.

To lower the suspension unit on the left in FIG. 3, the left isolation valve 130 is opened and the changeover valve 134 connects the working chamber 132b of the actuator 132 to the return line T of the vehicle hydraulic system 136. The piston 132c now moves upwards under the difference in pressure between the working chambers 132a and 132b to increase the volume of the working chamber 132a and drains fluid from the left damper 126 and accumulator 128.

To correct the attitude of the cab in the same sense, it is necessary to raise the damper 126 on the right of the drawing. This is achieved by closing the left shut-off valve 130, opening the right shut-off valve 130 and setting the changeover valve 134 to connect the upper working chamber 132b of the actuator 132 to the pressure line P of the vehicle hydraulic system 136. The higher pressure in the working chamber 132b now forces the piston 132c downwards to pump fluid into the right accumulator 128 and damper 126 to raise the cab.

It is important to note that by using an actuator 132 powered by the vehicle hydraulic system 136, the embodiment of the invention in FIG. 3 allows the individual suspension units to be raised and lowered without the hydraulic fluid drawn from the vehicle hydraulic system ever mixing with that circulating in the suspension unit 114. In this way, the need for a pumping unit is avoided by using equipment already present in the vehicle, without detriment to the cab suspension nor to the vehicle hydraulic system 136.

In the system described above there is only used a single actuator 132 to control both suspension units 114. It is clear that as an alternative it is also possible to associate a single actuator 132 with each suspension unit 114.

Figure 4:
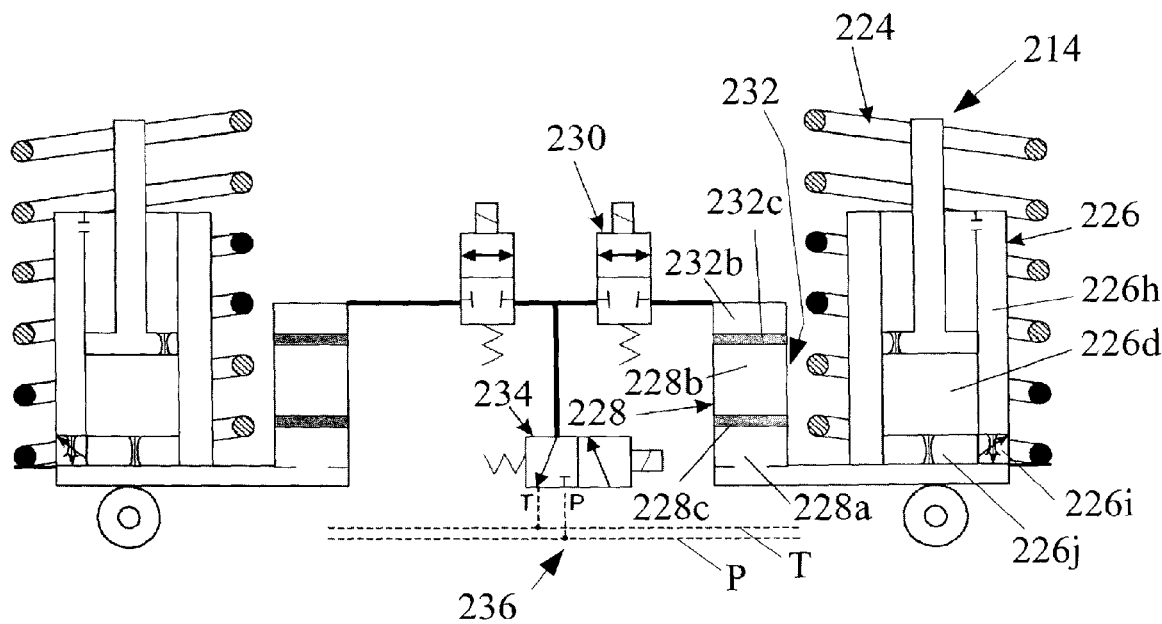
FIG. 4 is a view similar to that of FIG. 3 showing an alternative embodiment of the invention.

The system of FIG. 4 achieves the same objectives as that of FIG. 3 but uses a different hydraulic circuit configuration. Items serving the same function have been allocated the same reference numerals in the "200" series instead of the "100" series and will not be described a second time. For example the suspension unit 214 corresponds to the suspension unit 114, the spring 224 corresponds to the spring 114 and the damper 226 corresponds to the damper 126 of the embodiment shown in FIG. 3.

In FIG. 4, the two chamber hydro-gas accumulator 128 is replaced by an accumulator 228 having three chambers 228a, 228b and 232b separated by two movable walls 228c and 232c, that are shown as being floating pistons. As an alternative, the movable walls 228c and 232c can be formed by resilient diaphragms. Working chambers 228a and 228b correspond to working chamber 128a and 128b, one working chamber 228a being filled with hydraulic fluid and the other working chamber 228b being filled with gas, for example air, and acting as a gas spring. Working chamber 232b and movable wall 232c act as an actuator 232 replacing chamber 132b and movable wall 132c of the actuator 132 of embodiment in FIG. 3 that is formed as a separate unit. Each working chamber 232b is connected by a respective shut-off valve 230 and a common changeover valve 234 to the vehicle hydraulic system 236. Working chamber 228a is connected to working chamber 226d of the damper 226 through valve 226j and to space 226h of the damper 226 through controlled valve 226i.

If it is desired to raise the piston of the damper 226 of the suspension unit 214 on the right in FIG. 4, the right shut-off valve 230 is opened and the changeover valve 234 connects the working chamber 232b to the high pressure line P of the vehicle hydraulic system 236. The volume of the working chamber 232b is therefore expanded and acts through the gas spring formed by the working chamber 228b on the chamber 228a to cause hydraulic fluid to be transferred from the accumulator 228 to the damper 226.

What is claimed is:

1. An agricultural vehicle having a vehicle hydraulic system and a cab for the vehicle operator, the vehicle comprising:
 a self levelling suspension system having a plurality of suspension units each having a spring, a damper and an accumulator, wherein the accumulator comprises a hydraulic working chamber that is separated by a movable wall from a gas filled chamber serving as a spring, and is connected to at least one working chamber of the damper in a closed hydraulic circuit; and
 a hydraulic actuator configured to be powered by the vehicle hydraulic system and configured for powering hydraulic fluid to flow in the closed hydraulic circuit between the hydraulic working chamber of the accumulator and the at least one working chamber of the damper, wherein the actuator is integrated with the accumulator into a single unit having two movable walls defining three variable volume working chambers, the variable volume chambers including two hydraulic working chambers separated from one another by a gas filled working chamber, wherein one of the hydraulic working chambers is connected to the working chamber of the damper and the other hydraulic working chamber connected by a single changeover valve to a supply and a return line of the vehicle hydraulic system, so as to vary the height of the cab without any fluid from the vehicle hydraulic system entering or leaving the closed hydraulic circuit of the damper and the accumulator.

2. An agricultural vehicle as claimed in claim 1, wherein the single changeover valve is shared by a plurality of suspension units, wherein isolation valves are located between the changeover valve and the suspension units.

3. An agricultural vehicle as claimed in claim 1, wherein movement of the cab about each two mutually inclined axes is controlled by a pair of suspension units arranged on each side of the respective axis.

* * * * *